United States Patent
Ramagem et al.

(10) Patent No.: US 9,377,876 B2
(45) Date of Patent: Jun. 28, 2016

(54) VISUAL WHITEBOARD FOR TELEVISION-BASED SOCIAL NETWORK

(75) Inventors: Daniel Bloomfield Ramagem, North Bethesda, MD (US); Charles W. K. Gritton, Sterling, VA (US); Negar Moshiri, Bethesda, MD (US); Stephen Scheirey, Urbana, MD (US); William A. Rouady, Purcellvile, VA (US); Daniel S. Simpkins, Bethesda, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 135 days.

(21) Appl. No.: 13/326,989

(22) Filed: Dec. 15, 2011

(65) Prior Publication Data

US 2012/0154449 A1 Jun. 21, 2012

Related U.S. Application Data

(60) Provisional application No. 61/423,429, filed on Dec. 15, 2010.

(51) Int. Cl.

| | |
|---|---|
| *G06F 3/0346* | (2013.01) |
| *H04N 21/422* | (2011.01) |
| *H04N 21/4788* | (2011.01) |
| *H04N 21/4782* | (2011.01) |
| *H04N 21/488* | (2011.01) |

(52) U.S. Cl.
CPC ........ *G06F 3/0346* (2013.01); *H04N 21/42206* (2013.01); *H04N 21/42222* (2013.01); *H04N 21/4788* (2013.01); *H04N 21/4782* (2013.01); *H04N 21/4882* (2013.01)

(58) Field of Classification Search
CPC ................... H04N 21/4788; H04N 21/42206; H04N 21/42222; H04N 21/4882; H04N 21/4782; G06T 19/00; G06T 11/60; G06T 11/00; G06F 3/0481; G06F 9/4443; G06F 3/0346; G06F 3/0485; G06F 2203/04806
See application file for complete search history.

(56) References Cited

U.S. PATENT DOCUMENTS

| | | | | | |
|---|---|---|---|---|---|
| 5,819,092 | A | * | 10/1998 | Ferguson et al. | 717/113 |
| 5,825,308 | A | * | 10/1998 | Rosenberg | 341/20 |
| 5,920,304 | A | * | 7/1999 | Berstis | 715/861 |
| 5,961,602 | A | * | 10/1999 | Thompson et al. | 709/229 |
| 6,018,345 | A | * | 1/2000 | Berstis | 715/859 |
| 6,097,371 | A | * | 8/2000 | Siddiqui et al. | 345/164 |
| 6,163,779 | A | * | 12/2000 | Mantha et al. | 715/234 |
| 6,226,642 | B1 | * | 5/2001 | Beranek et al. | 348/211.13 |
| 6,694,356 | B1 | * | 2/2004 | Philyaw | 709/217 |
| 6,765,557 | B1 | * | 7/2004 | Segal et al. | 345/173 |
| 6,886,013 | B1 | * | 4/2005 | Beranek | 715/234 |

(Continued)

OTHER PUBLICATIONS

Western Digital, "WD TV Live Hub Media Center", Aug. 2010.*

(Continued)

*Primary Examiner* — Phi Hoang
*Assistant Examiner* — Charles L Beard
(74) *Attorney, Agent, or Firm* — Patent Portfolio Builders PLLC (57) ABSTRACT

A visual whiteboard can be provided as an application, or component of a TV internet browser, for operation on a smart TV. The visual whiteboard provides a lightweight social networking mechanism, e.g., for groups who have physical access to the same smart TV. Content identifiers or other group information can be posted to the visual whiteboard by the authorized users for subsequent display on the corresponding smart TV.

10 Claims, 6 Drawing Sheets

(56) References Cited

U.S. PATENT DOCUMENTS

| | | | |
|---|---|---|---|
| 6,956,558 B1* | 10/2005 | Rosenberg et al. | 345/156 |
| 7,103,904 B1* | 9/2006 | Blackketter et al. | 725/32 |
| 7,111,042 B2* | 9/2006 | Kikugawa | 709/204 |
| 7,263,667 B1* | 8/2007 | Hoellerer | G01C 21/20 715/738 |
| 7,337,217 B2* | 2/2008 | Wang | G06F 3/0481 386/E5.002 |
| 7,424,543 B2* | 9/2008 | Rice, III | 709/229 |
| 7,818,194 B2* | 10/2010 | Yoshida et al. | 705/7.32 |
| 7,839,385 B2* | 11/2010 | Hunleth | G06F 3/017 345/156 |
| 7,895,625 B1* | 2/2011 | Bryan et al. | 725/46 |
| 8,046,705 B2 | 10/2011 | Hunleth et al. | |
| 8,359,545 B2* | 1/2013 | Pixley et al. | 715/786 |
| 8,402,357 B1* | 3/2013 | Norwood et al. | 715/202 |
| 8,478,903 B2* | 7/2013 | Farber et al. | 709/245 |
| 8,862,672 B2* | 10/2014 | Williams | G06F 3/0481 709/205 |
| 8,935,630 B2* | 1/2015 | Wroblewski | G06F 3/0346 715/764 |
| 9,110,929 B2* | 8/2015 | Garcia | H04L 65/4084 |
| 2002/0054060 A1* | 5/2002 | Schena | 345/701 |
| 2002/0056088 A1* | 5/2002 | Silva et al. | 725/9 |
| 2002/0069411 A1* | 6/2002 | Rainville et al. | 725/37 |
| 2002/0112237 A1* | 8/2002 | Kelts | G06F 3/0481 725/39 |
| 2002/0147988 A1* | 10/2002 | Nakano | 725/134 |
| 2003/0003936 A1* | 1/2003 | Tighe | 455/517 |
| 2003/0229900 A1* | 12/2003 | Reisman | 725/87 |
| 2004/0268393 A1 | 12/2004 | Hunleth et al. | |
| 2005/0209904 A1* | 9/2005 | Hayashi | 705/9 |
| 2005/0259077 A1* | 11/2005 | Adams et al. | 345/163 |
| 2006/0001647 A1* | 1/2006 | Carroll | 345/156 |
| 2006/0176403 A1* | 8/2006 | Gritton et al. | 348/581 |
| 2006/0250358 A1* | 11/2006 | Wroblewski | 345/157 |
| 2006/0262116 A1* | 11/2006 | Moshiri et al. | 345/419 |
| 2007/0016877 A1* | 1/2007 | Shirakawa et al. | 715/810 |
| 2007/0035518 A1* | 2/2007 | Francz et al. | 345/163 |
| 2007/0162356 A1* | 7/2007 | Nguyen et al. | 705/28 |
| 2007/0176896 A1* | 8/2007 | Gritton et al. | 345/157 |
| 2007/0192739 A1* | 8/2007 | Hunleth et al. | 715/823 |
| 2007/0200871 A1* | 8/2007 | Lee | 345/619 |
| 2008/0028323 A1* | 1/2008 | Rosen et al. | 715/752 |
| 2008/0046442 A1* | 2/2008 | Grason et al. | 707/100 |
| 2008/0059571 A1* | 3/2008 | Khoo | 709/203 |
| 2008/0098433 A1* | 4/2008 | Hardacker et al. | 725/52 |
| 2008/0148177 A1* | 6/2008 | Lang | G06F 3/0481 715/784 |
| 2008/0222295 A1* | 9/2008 | Robinson et al. | 709/227 |
| 2008/0222675 A1* | 9/2008 | Moshiri et al. | 725/38 |
| 2008/0250332 A1* | 10/2008 | Farrell et al. | 715/753 |
| 2008/0270938 A1* | 10/2008 | Carlson | 715/810 |
| 2008/0313049 A1* | 12/2008 | Lai et al. | 705/26 |
| 2009/0249244 A1* | 10/2009 | Robinson et al. | 715/781 |
| 2009/0288039 A1* | 11/2009 | Mail et al. | 715/815 |
| 2009/0288043 A1* | 11/2009 | Willis | G06F 3/0488 715/859 |
| 2009/0299843 A1* | 12/2009 | Shkedi | 705/14.25 |
| 2009/0319672 A1* | 12/2009 | Reisman | 709/227 |
| 2010/0086022 A1* | 4/2010 | Hunleth et al. | 375/240.01 |
| 2010/0110105 A1* | 5/2010 | Kinnunen et al. | 345/629 |
| 2010/0115559 A1* | 5/2010 | Ellis | 725/53 |
| 2010/0169918 A1* | 7/2010 | Biesemeyer et al. | 725/39 |
| 2010/0205631 A1* | 8/2010 | Heald | 725/34 |
| 2011/0004887 A1* | 1/2011 | Stringer | G06F 3/0481 719/328 |
| 2011/0022602 A1* | 1/2011 | Luo et al. | 707/748 |
| 2011/0041082 A1* | 2/2011 | Nguyen | 715/752 |
| 2011/0090898 A1* | 4/2011 | Patel et al. | 370/352 |
| 2011/0099263 A1* | 4/2011 | Patil et al. | 709/224 |
| 2011/0109570 A1* | 5/2011 | Mady et al. | 345/173 |
| 2011/0219395 A1* | 9/2011 | Moshiri et al. | 725/30 |
| 2011/0231484 A1* | 9/2011 | Burgess et al. | 709/203 |
| 2011/0304557 A1* | 12/2011 | Wilburn et al. | 345/173 |
| 2012/0030613 A1* | 2/2012 | Moshiri et al. | 715/784 |
| 2012/0038496 A1* | 2/2012 | Edwards | 341/34 |
| 2012/0056806 A1* | 3/2012 | Rosenberg et al. | 345/157 |
| 2012/0068928 A1* | 3/2012 | Bruss et al. | 345/163 |
| 2012/0162536 A1* | 6/2012 | Sibilsky et al. | 348/734 |
| 2012/0223886 A1* | 9/2012 | Yu | 345/160 |
| 2012/0262370 A1* | 10/2012 | Ko et al. | 345/157 |
| 2012/0266069 A1* | 10/2012 | Moshiri | G06F 3/0346 715/719 |
| 2012/0291070 A1* | 11/2012 | Feng et al. | 725/40 |
| 2013/0138746 A1* | 5/2013 | Tardelli et al. | 709/206 |
| 2013/0318159 A1* | 11/2013 | Earnshaw et al. | 709/204 |
| 2014/0313130 A1* | 10/2014 | Yamano | G06F 3/0488 345/157 |

OTHER PUBLICATIONS

American Majority, Facebook A Beginners Guide, Mar. 12, 2010.*
Western_Digital_aug_2010_Fig_A (from Western Digital, WD TV Live Hub Media Center), Aug. 2010.*
Western_Digital_aug_2010_Fig_B (from Western Digital, WD TV Live Hub Media Center), Aug. 2010.*
Western Digital, WD TV Live HD Media Player, Feb. 2010.*
Fig_5_extended (from recited Norwood et al. U.S. Pat. No. 8,402,357 B1).*
Fig_6_extended (from recited Norwood et al. U.S. Pat. No. 8,402,357 B1).*
Fig_7_extended (from recited Norwood et al. U.S. Pat. No. 8,402,357 B1).*

* cited by examiner

VISUAL WHITEBOARD FOR TELEVISION-BASED SOCIAL NETWORK

RELATED APPLICATION

The present application is related to, and claims priority from, U.S. Provisional Patent Application Ser. No. 61/423,429 entitled "INTERACTION ARCHITECTURE FOR THE TV" to Daniel S. Simpkins, filed on Dec. 15, 2010, the disclosure of which is incorporated herein by reference.

BACKGROUND

The present invention describes social networking techniques, devices, systems and software which can be used in conjunction with social networks associated with a television, e.g., a family social networking tool.

Technologies associated with the communication of information have evolved rapidly over the last several decades. Television, cellular telephony, the Internet and optical communication techniques (to name just a few modes of communications) combine to inundate consumers with available information and entertainment options. Taking television as an example, the last three decades have seen the introduction of cable television service, satellite television service, pay-per-view movies and video-on-demand, both of the latter being made available by cable, fiber-optic, and satellite service providers, as well as over the internet (e.g., Netflix®). Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

Today, social sites like Facebook and LinkedIn allow users to form communities of friends and colleagues. Using these applications, users can naturally form communities of the people relevant to them—these communities are thus centered around the user. While they are very useful in achieving their purpose of enabling individuals to create individualized communities which may then be selectively linked together to create a global network of individualized communities, these social networks present their own challenges, e.g., related to privacy, and not everyone is comfortable with being part of a global community despite their advantages.

An alternative social networking idea is proposed herein—a community built around the TV or, more specifically, the community space the TV is in itself. That community could then, of course, expand from there (just like Facebook and LinkedIn can from their center of a person), or alternatively could be a substantially closed, mini-community that provides an enhanced social networking tool that is centered around a close knit group of people, e.g., a family or work group. Since the TV is a group device, this imbues it with a natural social component and an immediate community, namely the group of people who physically share that space (whether it's a household, work, or commercial location).

Accordingly, it would be desirable to provide social networking techniques, devices, systems and software (applications) which facilitate the usage of the TV as a social networking tool centered about a group of people.

SUMMARY

It is therefore a general aspect of the invention to provide a visual whiteboard which can be provided as an application, or component of a TV internet browser, for operation on a smart TV. The visual whiteboard provides a lightweight social networking mechanism, e.g., for groups who have physical access to the same smart TV. Content identifiers or other group information can be posted to the visual whiteboard by the authorized users for subsequent display on the corresponding smart TV.

According to an embodiment, a TV internet browser includes a display region for displaying web content on a television; a cursor, displayed over the web content, and movable in response to pointing input received by the TV internet browser; an input interface for receiving said pointing input and user selection input; and a visual whiteboard component configured to display content identifiers in a list on the television, the list being accessible only by a group of authorized users, wherein the content identifiers can be selected via the user selection input to launch corresponding content for output on the television.

BRIEF DESCRIPTION OF THE DRAWINGS

The accompanying drawings illustrate exemplary embodiments, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIGS. 2-6. A discussion of social networking tools and techniques according to exemplary embodiments begins in detail following the header entitled "Visual Whiteboard" below. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

Figure 1:
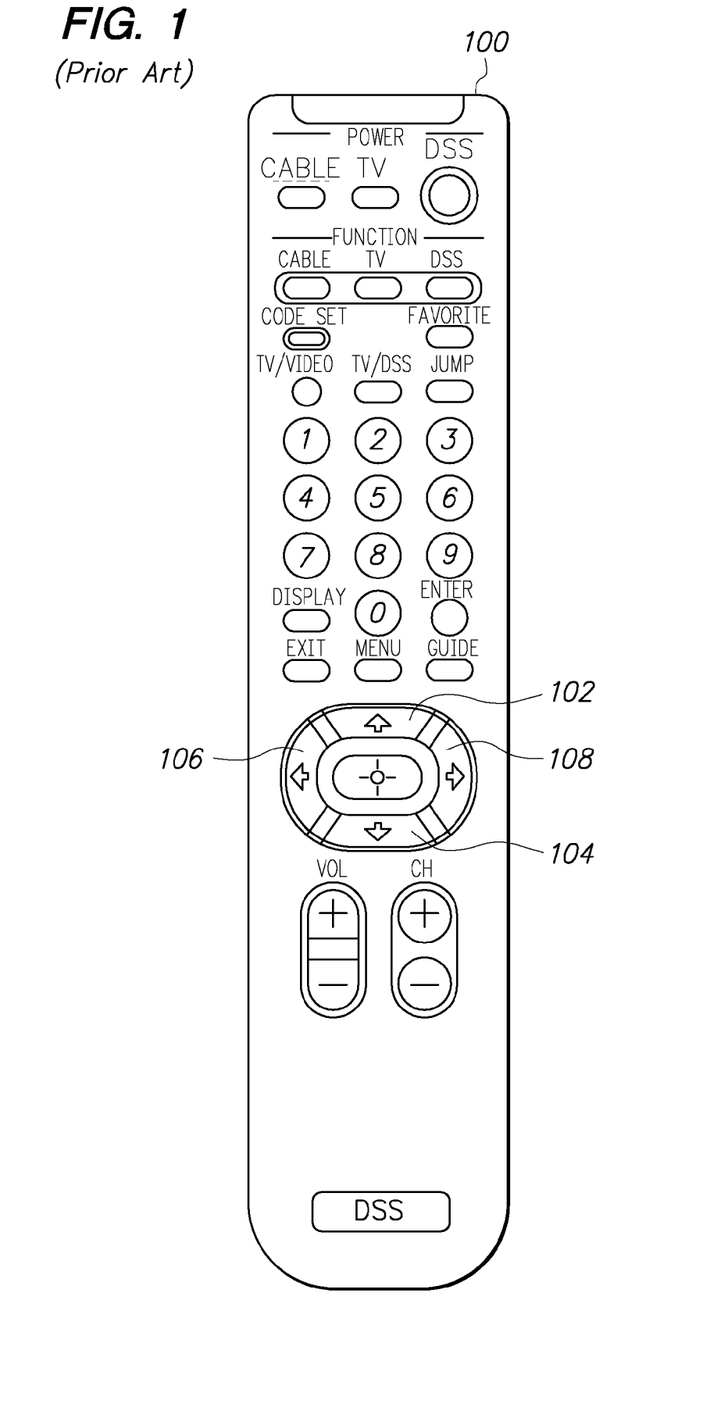
FIG. 1 depicts a conventional remote control unit for an entertainment system.
Figure 2:
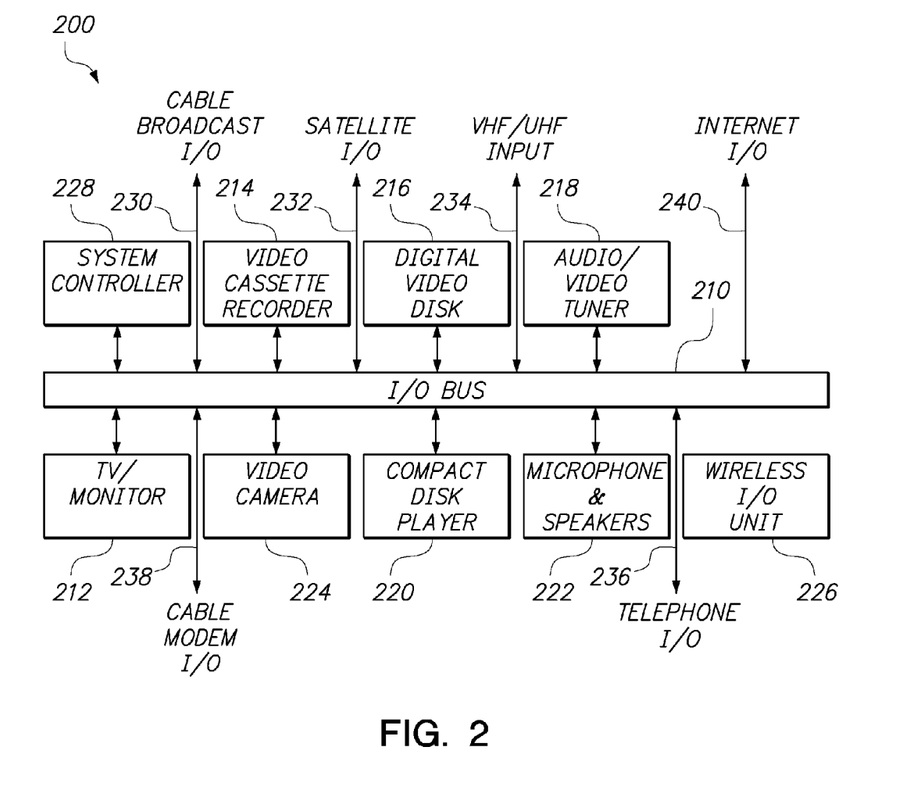
FIG. 2 depicts an exemplary media system in which exemplary embodiments can be implemented.

In this exemplary embodiment, the media system 200 includes a television (TV)/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

As further illustrated in FIG. 2, media system 200 may be configured to receive media items from various media sources and service providers. In this exemplary embodiment, media system 200 receives media input from and, optionally, sends information to, any or all of the following sources: cable broadcast 230 (e.g., via coaxial cable, or optionally a fiber optic cable), satellite broadcast 232 (e.g., via a satellite dish), very high frequency (VHF) or ultra-high frequency (UHF) radio frequency communication of the broadcast television networks 234 (e.g., via an aerial antenna), telephone network 236 and cable modem 238 (or another source of Internet content). A "smart" TV can also include an Internet connection 240, e.g., an Ethernet port or WLAN transceiver. Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in, for example, U.S. Pat. No. 8,046,705. Alternatively, social networking tools in accordance with the present invention can be used in conjunction with other systems, for example computer systems including, e.g., a display, a processor and a memory system or with various other systems and applications.

Figure 3:
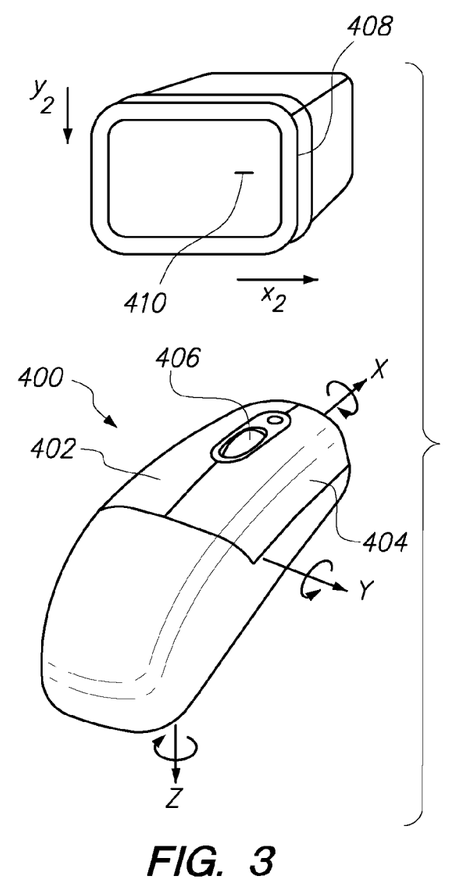
FIG. 3 shows a 3D pointing device according to an exemplary embodiment of the present invention.

Remote devices which operate as 3D pointers may also be used in conjunction with social networking tools described below, but are not required. Such devices enable the translation of movement, e.g., gestures, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some such devices can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406.

It is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
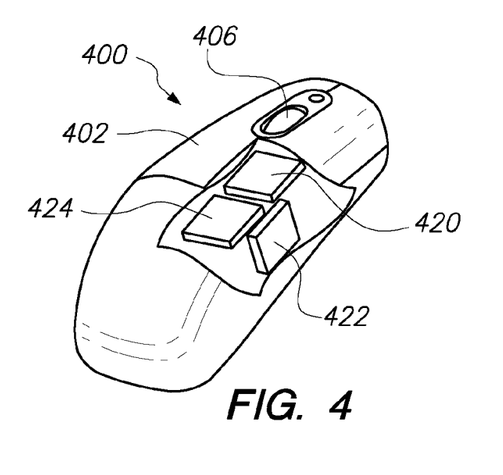
FIG. 4 illustrates a cutaway view of the 3D pointing device in FIG. 4 including two rotational sensors and one accelerometer.

According to one embodiment, two rotational sensors 420 and 422 and one accelerometer 424 can be employed as sensors in 3D pointing device 400 as shown in FIG. 4. Although this exemplary embodiment employs inertial sensors to sense motion it will be appreciated that the present invention is not so limited and examples of other types of sensors which can be used in conjunction with other exemplary embodiments are provided below. The rotational sensors 420 and 422 can, for example, be implemented using ADXRS150 or ADXRS401 sensors made by Analog Devices. It will be appreciated by those skilled in the art that other types of rotational sensors can be employed as rotational sensors 420 and 422 and that the ADXRS150 and ADXRS401 are purely used as an illustrative example.

Unlike traditional gyroscopes, these exemplary rotational sensors use micro electromechanical systems (MEMS) technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 420 and 422 have a single sensing axis (as for example the ADXRS150s), then they can be mounted in the 3D pointing device 400 such that their sensing axes are aligned with the rotations to be measured. For this exemplary embodiment of the present invention, this means that rotational sensor 422 is mounted such that its sensing axis is parallel to the y-axis and that rotational sensor 420 is mounted such that its sensing axis is parallel to the z-axis as shown in FIG. 4.

It will be appreciated that different sensor packages may be available which could lead to other exemplary implementations. For example, the two 1-D rotational sensors 420 and 422 could be replaced by a single, 2D rotational sensor package which provides outputs of rotational motion along, e.g., the y and z axes. One exemplary 2-D rotational sensor is the InvenSense IDG-300, although it will be appreciated that other sensors/sensor packages may also be used. The rotational sensors 420, 422 can be 1-D, 2-D or 3-D sensors. The accelerometer 424 can, for example, be a 3-axis linear accelerometer, although a 2-axis linear accelerometer could be used by assuming that the device is measuring gravity and mathematically computing the remaining $3^{rd}$ value. Additionally, the accelerometer(s) and rotational sensor(s) could be packaged together into a single sensor package. A magnetometer could be used to replace either or both of the accelerometer(s) and/or rotational sensor(s). Other variations of sensors and sensor packages may also be used in conjunction with these exemplary embodiments.

Figure 5:
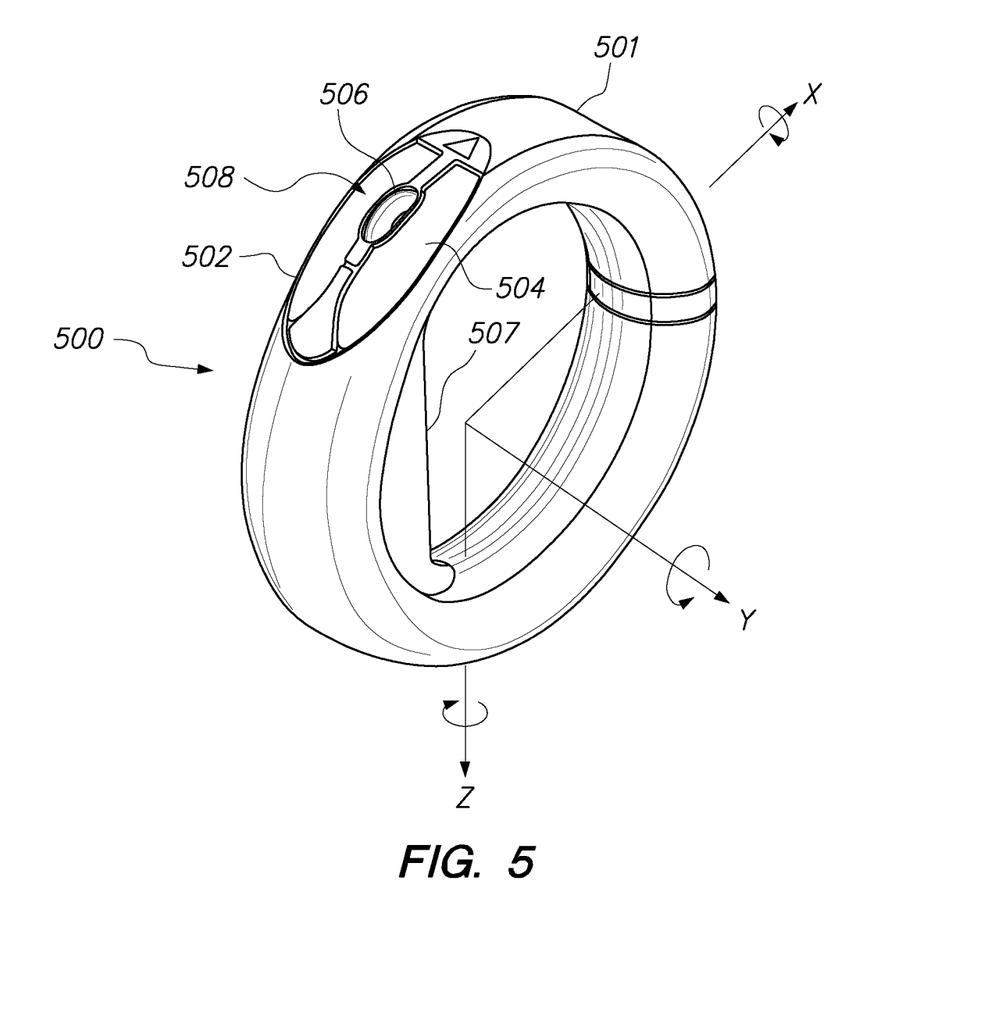
FIG. 5 shows a 3D pointing device according to another exemplary embodiment.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501. More details regarding this embodiment can be found in U.S. patent application Ser. No. 11/480,662, entitled "3D Pointing Devices", filed on Jul. 3, 2006, the disclosure of which is incorporated here by reference.

Figure 6:
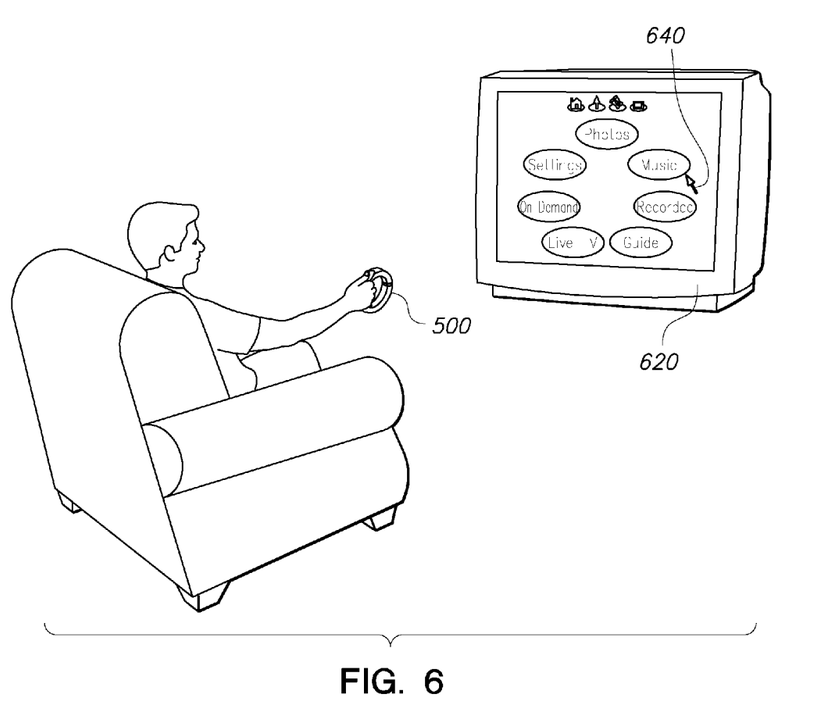
FIG. 6 depicts the 3D pointing device of FIG. 5 being used as part of a "10 foot" interface according to an exemplary embodiment.

Such 3D pointing devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 500 and transmitted to the television 620 (or associated system component, e.g., a set-top box (not shown)). Movement of the 3D pointing device 500 can, for example, be translated into movement of a cursor 640 displayed on the television 620 and which is used to interact with a user interface. Details of an exemplary user interface with which the user can interact via 3D pointing device 500 can be found, for example, in the above-incorporated U.S. patent application Ser. No. 10/768,432 as well as U.S. patent application Ser. No. 11/437,215, entitled "Global Navigation Objects in User Interfaces", filed on May 19, 2006, the disclosure of which is incorporated here by reference.

Visual Whiteboard

A living room television set is likely to be used and watched by several people in a household. If someone has a smart TV, this transforms the TV usage scenarios from being merely passive watching experiences into those associated with a shared digital hub for Internet content. A smart TV operating as a shared digital hub might encourage a number of new behaviors and interactions such as:

1. Active and passive users; the former will be the ones engaged in browsing and searching for content (videos, emails, updates from social networks, etc.); the latter will be those who may (initially) merely observe the ongoing activities on the screen, whether from walking past the shared social space or sitting on the couch.

2. Consumption of video and audio content will predominate (but not eliminate) the textual.

3. Individuals wanting to synchronize their browsing information (e.g., history, bookmarks) between their various devices or environments (e.g., work computer, office laptop, home PC).

4. Individuals wanting to save online videos for watching later at home on their TV.

5. Individuals wanting to share videos with other members of the local group.

6. Local groups wanting to share videos with people outside the immediate group.

It will be appreciated that the foregoing are just some of the examples of expected interactions which may occur as smart TVs are introduced into the homes and workplaces. New tools will be needed to support such interactions. For example, TV-based Internet browsers can support the first two items listed above, an example of which is found in U.S. Patent Application Publication No. 20110231484, entitled "TV Internet Browser", filed on Mar. 22, 2011, to Burgess et al., the disclosure of which is incorporated here by reference. With the inclusion of some cross-browser bookmarking technology (e.g., a la Xmarks), such a TV-based Internet browser could also support the bookmarking aspect of item #3 as well. Items 4 through 6 are interesting because they add convenience to the user and support a core activity of the social digital age: the ability to push and receive "personalized" media—that is, content that has been selected (hand-picked in a sense) by other members of a user's community.

A mechanism for direct sharing of information via the social graph would be particularly powerful at the scale of the TV local community. Consider, in this regard, the difference between an individual randomly finding a funny cat video posted on a large site like Digg, or alternatively seeing that same video as a result of it being shared within your more limited Twitter group or your family at home. This idea gains even more relevance when it is promoted by those with whom you share a physical space at some point of your daily routine ("Did you see that funny cat video I sent you???").

Existing, individualized social networking services do enable experience sharing, however such experience sharing is primarily among "virtual" friends in large groups that don't share a physical space. That is, generic sharing is supported by existing social networks, but their features don't exclusively promote the local video sharing interactions happening around the physical TV. Accordingly, embodiments discussed herein provide local community tools which are designed to promote local installations and shared experiences associated with a group that can also (at times) share a same physical location, e.g., in the home's living room.

Such tools are intended to, for example, make it easy for a smart TV user to share videos with other local users. According to an embodiment, this involves the provision of a visual whiteboard which is displayed on the television that lists, for example, recently selected pages/links and videos by any user in a manner analogous to a family's kitchen corkboard, refrigerator whiteboard or an electronic bulletin board. Alternatively, the visual whiteboard could be more sophisticated and include smart TV user accounts/profiles, comments, ratings, etc. Various other features of visual whiteboards according to exemplary embodiments can include:

Allowing sharing of the visual whiteboard with other smart TV installations;

Smart TV's within a household, or even between households could allow read-only (or even read-write) access their whiteboards. Authorization could be handled with something as simple as some form of "friend code" whereby a secret string key is communicated and exchanged between pairs of users choosing to share their content.

Allowing some minimal characterization of the whiteboard, such as giving it a name and picture (e.g., "Bob's household," photo of the family sitting on the couch). Using this feature, the visual whiteboard could be displayed on a TV's home page as an iconic representation which is then expanded so that the user sees the entire visual whiteboard when actuated.

Creating one or more external interfaces (i.e., away from the TV Internet browser) to allow some management of the whiteboard and its content. This could be a website where a user might log in and add and delete items from the whiteboard. A flexible API it opens up the possibility for various clients (e.g., iPhone, iPad, Android, etc.). Cross-browser bookmarklets could allow a user on a different browser, at a different location, to post an item to the whiteboard.

According to some embodiments, allowing non-community users to suggest additions to the whiteboard. Other embodiments might preclude this to address groups that prefer enhanced privacy and avoid social "noise" caused by effectively unlimited group size.

Various use case scenarios exist for a visual whiteboard tool associated with a smart TV according to these embodiments. For example, users often get emails with YouTube videos from parents and siblings who live in different households. Such emails or links can be sent directly to the visual whiteboard if the other person was a part of the small group authorized to add content to the whiteboard (or if the other person was temporarily authorized to do so). To further understand the benefits of visual whiteboards associated with embodiments, consider the following exemplary use case scenario.

Use Case Scenario:

George Jetson is at work and receives an email from a colleague, containing a funny cat video. He watches 5 seconds of the clip, chuckles, and hits the "Add to Visual Whiteboard" button on his browser, i.e., in this example George's browser operating on his work computer is cross-linked to his TV Internet browser at home. A notification briefly alerts him of the success of the operation. George continues working and later receives another email, this time it's a longer video about the ongoing problems of a gas leak on Saturn. He watches 3 minutes of it and thinks that he should save it for watching it with his son, Elroy, who is writing a school essay on the topic. Again he performs the "add to Visual Whiteboard" to add this to the visual whiteboard associated with his home television.

Meanwhile, his wife Jane who is home today, takes a break from her work to catch up on some of web-only episodes of her favorite sitcom. She uses the TV Internet browser operating on the family TV in the living room and notices the new videos George added to the visual whiteboard. George clearly wanted the family to later see these videos, so she peruses the visual directory and decides to watch the short cat video, which turns out be very funny. She saves the gas leak video for later because it would probably be good to watch it when the rest of the family gets together.

Judy, the sixteen year old, has returned from school and is doing some web browsing before starting her homework for the day. She too finds an interesting video about fashion that she thinks her mother might like to watch. Instead of huddling around her bedroom laptop, she "Adds to Visual Whiteboard" and proceeds to the living room where she and Jane watch the video, now listed on the whiteboard, together. Subsequently they remove it from the whiteboard because they know neither George now Elroy will care for it.

In the evening when the entire family is assembled for dinner, George insists they all become more informed about the gas leak spill on Saturn. George, Jane, Judy, and Elroy all go to living room and watch the video together. Before proceeding to the dinner table George decides that the two videos he added today were entertaining and educational, so he selects to share the visual whiteboard with his boss, Cosmo, who needs to relax from the worries of managing Spacely Sprockets. The interface prompts George for Cosmo's email address and a link is sent with information to the latter.

Cosmo is checking email that night from home and gets the message from George. He is curious about the possibility of sharing a visual whiteboard, e.g., as part of a TV Internet browser, so he installs it on his already-connected-to-the-TV computer. He then follows the simple instructions to link his visual whiteboard with the Jetson's whiteboard. In a matter of minutes he is presented with a set of videos that the Jetsons decided to share with friends. Cosmo doesn't care for videos with animals, but he is certainly concerned about the financial implications of the Saturn gas leak, so he proceeds to watch that video.

From the foregoing, it will be apparent that a visual whiteboard tool displayed on televisions according to embodiments is likely to enhance the social networking among small groups of people for shareable media items having a group, rather than an individual, focus. The visual whiteboard can, for example, be implemented as a document, web page, or other mechanism having certain attributes, e.g., (a) displayable on a television, (b) as part of (or connected to) a TV Internet browser application, (c) with limited access by members of a small group, e.g., a family, and (d) including simple functions (e.g., add item, erase item, play item) which allow the visual whiteboard to function essentially as short-term, group oriented messaging and storage of links or pointers to media items that are intended to be shared with other members of the group who share physical access to the same television. Such visual whiteboards provide for a simple and group oriented social experience that provides a lightweight local sharing feature which will be compelling for stressed and busy families, without the noise and complexity of today's high data rate, individual focused, social networks.

Thus according to an embodiment, a TV internet browser can include a display region for displaying web content on a television, a cursor, displayed over the web content, and movable in response to pointing input received by said TV internet browser; an input interface for receiving said pointing input and user selection input; and a visual whiteboard component configured to display content identifiers in a list on the television, the list being accessible only by a group of authorized users, wherein the content identifiers can be selected via the user selection input to launch corresponding content for output on the television. In addition to, or as an alternative to, content identifiers associated with videos and/or music, the visual whiteboard can also have applications or screen areas reserved for particular family members or topics—like when the user will be home, what's for dinner, who's coming over, etc. As mentioned earlier, embodiments wherein the visual whiteboard is incorporated into a TV Internet browser can include some or all of the elements of the TV Internet browser described in the above-incorporated by reference '484 U.S. Patent Publication.

Figure 7:
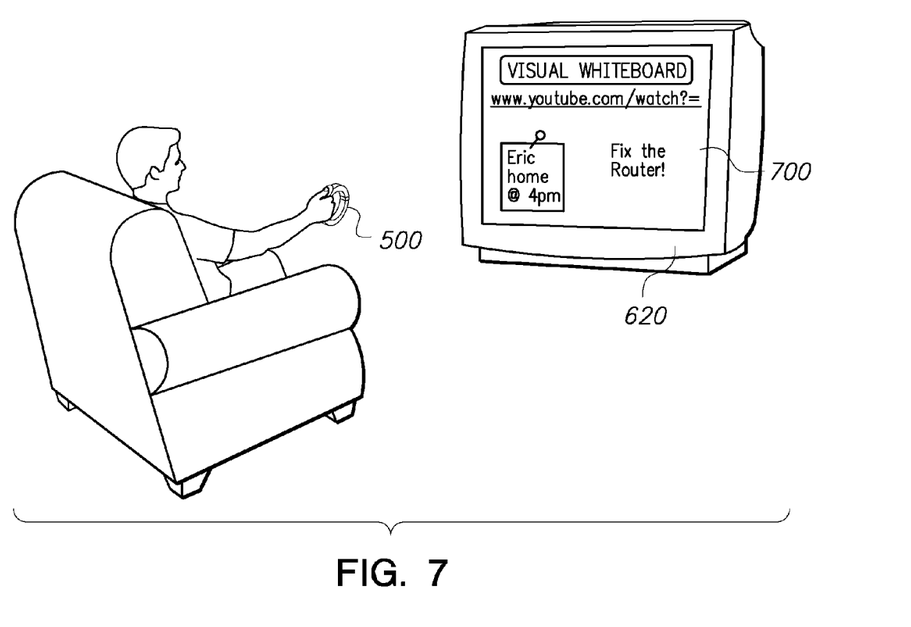
FIG. 7 shows a visual whiteboard according to an embodiment displayed on a television.

FIG. 7 depicts an example of a visual whiteboard 700 being displayed on the smart television 620 either as a part of a TV Internet browser or as a separate application. Therein, it can be seen that a content identifier (hyperlink to a video), and various notes have been posted to the visual whiteboard by authorized group members.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., television, set-top box or other device, or the software may run on a processor or computer housed within another device, e.g., a system controller, a game console, a personal computer, etc., which is in communication with the TV.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A TV internet browser comprising:
   a display region for displaying web content on a television;
   a cursor, displayed over said web content, and movable in response to pointing input received by said TV internet browser;
   an input interface for receiving said pointing input and user selection input; and
   a visual whiteboard component configured to display content identifiers in a list on the television, the list being accessible only by a group of authorized users,
   wherein said content identifiers can be selected via the user selection input to launch corresponding content for output on the television,
   wherein said visual whiteboard is displayed on said television and any user of the group of authorized users is able to post notes and content identifiers, and
   wherein any user of the group of authorized users is able to delete any notes and content identifiers from said same visual whiteboard,
   further comprising:
   changing an appearance of the cursor displayed over said displayed web content when exiting a scroll mode and entering a zooming/panning mode,
   wherein said deleted notes and content identifiers are no longer viewable by any user of the group of authorized users.

2. The TV internet browser of claim 1, wherein the group of authorized users are users having physical access to the same television.

3. The TV internet browser of claim 1, further comprising:
   an external interface configured to allow cross-linking between the TV internet browser and at least one other browser.

4. The TV internet browser of claim 3, wherein the external interface accepts commands from said group of authorized users to add a content identifier to the list in response to actuating an add button displayed by the at least one other browser, such that a selected content identifier displayed by the at least one other browser is added to the list.

5. The TV internet browser of claim 1, wherein the content identifiers are hyperlinks to video clips.

6. The TV internet browser of claim 1, further comprising:
   a mode control function configured to switch between said scroll mode and said zooming/panning mode in response to a user input, wherein, when in said zooming/panning mode, said mode control function operates to:
   (a) zoom, in response to a scroll wheel rotation input, into or away from said displayed web content; and
   (b) pan, in response to another button input and said pointer movement input, said displayed web content in a direction associated with movement of a pointing device.

7. The TV internet browser of claim 6, wherein said user input to switch between said scroll mode and said zooming/panning mode is a pressing of said scroll wheel.

8. The TV internet browser of claim 6, wherein said another button input is pressing and holding a button disposed on said pointing device while moving said pointing device.

9. The TV internet browser of claim 6, wherein said zoom function further comprises:
   zooming into said displayed web content if said scroll wheel rotation input is associated with one or more forward clicks of said scroll wheel; and
   zooming away from said displayed web content if said scroll wheel rotation input is associated with one or more backward clicks of said scroll wheel.

10. A visual whiteboard system comprising:
    a television with a display region for displaying web content on the television;
    a processor associated with the television; and
    a visual whiteboard application module configured to receive inputs over the Internet from authorized group members and to display the inputs on the television,
    wherein the visual whiteboard application module receives inputs via a cursor, displayed over said web content, and the cursor is movable in response to pointing input,
    wherein the visual whiteboard application module receives the pointing input and user selection input via an input interface,
    wherein the visual whiteboard application module is configured to display content identifiers in a list on the television, the list being accessible only by the group of authorized users and wherein the content identifiers can be selected via the user selection input to launch corresponding output on the television;
    wherein the visual whiteboard is displayed on said television and any user of the group of authorized users is able to post notes and content identifiers, and
    wherein any user of the group of authorized users is able to delete any notes and content identifiers from said same visual whiteboard, wherein said deleted notes and content identifiers are no longer viewable by any user of the group of authorized users,
    further comprising:
    changing an appearance of the cursor displayed over said displayed web content when exiting a scroll mode and entering a zooming/panning mode.

* * * * *